(12) United States Patent
Gürtler et al.

(10) Patent No.: US 8,933,192 B2
(45) Date of Patent: Jan. 13, 2015

(54) PROCESS FOR THE ACTIVATION OF DOUBLE METAL CYANIDE CATALYSTS FOR THE PREPARATION OF POLYETHER CARBONATE POLYOLS

(75) Inventors: Christoph Gürtler, Köln (DE); Stefan Grasser, Leverkusen (DE); Jörg Hofmann, Krefeld (DE); Aurel Wolf, Wülfrath (DE)

(73) Assignee: Bayer Intellectual Property GmbH, Monheim (DE)

( * ) Notice: Subject to any disclaimer, the term of this patent is extended or adjusted under 35 U.S.C. 154(b) by 0 days.

(21) Appl. No.: 13/574,146

(22) PCT Filed: Jan. 18, 2011

(86) PCT No.: PCT/EP2011/050626
§ 371 (c)(1),
(2), (4) Date: Jul. 19, 2012

(87) PCT Pub. No.: WO2011/089120
PCT Pub. Date: Jul. 28, 2011

(65) Prior Publication Data
US 2012/0289732 A1 Nov. 15, 2012

(30) Foreign Application Priority Data
Jan. 20, 2010 (EP) ..................... 10000511

(51) Int. Cl.
- C08G 64/16 (2006.01)
- C08G 64/34 (2006.01)
- C08G 64/02 (2006.01)
- C08G 64/18 (2006.01)

(52) U.S. Cl.
CPC ............ *C08G 64/34* (2013.01); *C08G 64/1608* (2013.01); *C08G 64/0208* (2013.01); *C08G 64/183* (2013.01)
USPC ......................................... 528/421; 528/425

(58) Field of Classification Search
CPC ................................................. C08G 64/1608
USPC .................................. 528/421, 425
See application file for complete search history.

(56) References Cited

U.S. PATENT DOCUMENTS

| | | |
|---|---|---|
| 3,404,109 A | 10/1968 | Milgrom |
| 3,829,505 A | 8/1974 | Herold |
| 3,941,849 A | 3/1976 | Herold |
| 5,158,922 A | 10/1992 | Hinney et al. |
| 5,470,813 A | 11/1995 | Le-Khac |
| 5,844,070 A | 12/1998 | Hayes et al. |
| 6,780,813 B1 | 8/2004 | Hofmann et al. |
| 7,008,900 B1 | 3/2006 | Hofmann et al. |
| 2003/0149232 A1 | 8/2003 | Hinz et al. |
| 2003/0204042 A1 | 10/2003 | Moethrath et al. |
| 2005/0159627 A1* | 7/2005 | Stosser et al. ................. 568/679 |
| 2006/0223973 A1* | 10/2006 | Hinz et al. ..................... 528/196 |
| 2006/0223979 A1* | 10/2006 | Ostrowski et al. ............ 528/425 |
| 2008/0021154 A1 | 1/2008 | Haider et al. |
| 2009/0306239 A1 | 12/2009 | Mijolovic et al. |

FOREIGN PATENT DOCUMENTS

| | | |
|---|---|---|
| DE | 102008000478 A1 | 9/2008 |
| EP | 0222453 A2 | 5/1987 |
| EP | 0700949 A2 | 3/1996 |
| EP | 0743093 A1 | 11/1996 |
| EP | 0761708 A2 | 3/1997 |
| EP | 0981407 A1 | 3/2000 |
| EP | 1359177 A1 | 11/2003 |
| EP | 1474464 A1 | 11/2004 |
| JP | 4145123 A | 5/1992 |
| WO | WO-97/40086 A1 | 10/1997 |
| WO | WO-98/16310 A1 | 4/1998 |
| WO | WO-00/47649 A1 | 8/2000 |
| WO | WO-01/39883 A1 | 6/2001 |
| WO | WO-03/029325 A1 | 4/2003 |
| WO | WO-2006/103214 A1 | 10/2006 |
| WO | WO-2008/013731 A1 | 1/2008 |
| WO | WO-2008/058913 A1 | 5/2008 |

OTHER PUBLICATIONS

International Search Report for PCT/EP2011/050626 mailed Apr. 15, 2011.

* cited by examiner

*Primary Examiner* — Robert Havlin
(74) *Attorney, Agent, or Firm* — Drinker Biddle & Reath LLP

(57) ABSTRACT

The present invention relates to a process for the activation of double metal cyanide (DMC) catalysts for the preparation of polyether carbonate polyols by catalytic copolymerisation of carbon dioxide ($CO_2$) with alkylene oxides in the presence of one or more H-functional starter substances.

15 Claims, No Drawings

PROCESS FOR THE ACTIVATION OF DOUBLE METAL CYANIDE CATALYSTS FOR THE PREPARATION OF POLYETHER CARBONATE POLYOLS

RELATED APPLICATIONS

This application is a national stage application (under 35 U.S.C. §371) of PCT/EP2011/050626, filed Jan. 18, 2011, which claims benefit of European Patent Application No. 10000511.5, filed Jan. 20, 2010.

The present invention relates to a process for the activation of double metal cyanide (DMC) catalysts for the preparation of polyether carbonate polyols by catalytic copolymerisation of carbon dioxide ($CO_2$) with alkylene oxides in the presence of one or more H-functional starter substances.

The preparation of polyether carbonate polyols by catalytic reaction of alkylene oxides (epoxides) and carbon dioxide in the presence or absence of H-functional starter substances (starters) has been the subject of intensive research for more than 40 years (e.g. Inoue et al., Copolymerization of Carbon Dioxide and Epoxide with Organometallic Compounds; Die Makromolekulare Chemie 130, 210-220, 1969). This reaction, for example using an H-functional starter compound, is shown schematically in scheme (I), wherein R represents an organic radical such as alkyl, alkylaryl or aryl, each of which can also contain heteroatoms such as, for example, O, S, Si, etc., and wherein e and f represent an integer, and wherein the product shown here in scheme (I) for the polyether carbonate polyol is simply to be so understood that blocks having the structure shown can in principle be found in the resulting polyether carbonate polyol but the sequence, number and length of the blocks as well as the OH functionality of the starter can vary and is not limited to the polyether carbonate polyol shown in scheme (I). This reaction (see scheme (I)) is ecologically very advantageous because this reaction represents the conversion of a greenhouse gas such as $CO_2$ into a polymer. The cyclic carbonate (for example for R=$CH_3$ propylene carbonate) shown in formula (I) is formed as a further product, actually a secondary product.

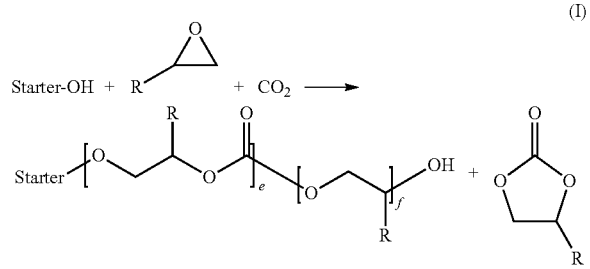

(I)

Activation within the scope of this invention denotes a step in which a partial amount of alkylene oxide compound, optionally in the presence of $CO_2$, is added to the DMC catalyst and then the addition of the alkylene oxide compound is interrupted, a temperature peak ("hotspot") and/or a pressure drop being observed in the reactor as a result of a subsequent exothermic chemical reaction. The process step of activation is the period of time from the addition of the partial amount of alkylene oxide compound, optionally in the presence of $CO_2$, to the DMC catalyst to the occurrence of the hotspot. In general, the activation step can be preceded by a step for drying the DMC catalyst and optionally the starter by elevated temperature and/or reduced pressure, this step of drying not being part of the activation step within the scope of the present invention.

The activation of a DMC catalyst for the purposes of the homopolymerisation of alkylene oxides (i.e. in the absence of carbon dioxide) is known. EP-A 0 981 407 discloses the activation of a DMC catalyst for the purposes of alkylene oxide polymerisation. The heating of a mixture of catalyst and starter in vacuo is extended in that inert gas at the same time flows through the mixture or in that the heating of a mixture of catalyst and starter is carried out in vacuo in the presence of an organic solvent. This leads to more rapid catalyst activation and to increased product quality. It is disadvantageous that the use of a solvent leads to increased costs (material costs for the solvent as well as additional process step for removing the solvent from the product) and that the space-time yield is reduced. The use in the copolymerisation of carbon dioxide ($CO_2$) with alkylene oxides in the presence of an H-functional compound is not disclosed in EP-A 0 981 407.

EP-A 1474464 discloses a reduction in the induction time for the activation of the catalyst in order to prepare polyether, which is achieved by adding an alkylene oxide to a mixture of DMC catalyst and starter at an internal reactor pressure of less than 1 bar. The use in the copolymerisation of carbon dioxide ($CO_2$) with alkylene oxides in the presence of an H-functional compound is not disclosed in EP-A 0 981 407.

EP-A 0 222 453 discloses a process for the preparation of polycarbonates from alkylene oxides and carbon dioxide using a catalyst system comprising DMC catalyst and a co-catalyst such as zinc sulfate. The polymerisation is thereby initiated by bringing a portion of the alkylene oxide into contact with the catalyst system a single time. Only then are the residual amount of alkylene oxide and the carbon dioxide metered in simultaneously. The amount of 60 wt. % alkylene oxide compound, relative to the starter, indicated in EP-A 0 222 453 in Examples 1 to 7 is high and has the disadvantage that it represents a certain safety risk for industrial applications because the homopolymerisation of alkylene oxide compounds is highly exothermic.

WO-A 2003/029325 describes a process in which the DMC catalyst is first brought into contact at least with a partial amount of the carbon dioxide, before the alkylene oxide is added. In a preferred embodiment, the anhydrous catalyst is dissolved or dispersed in an inert reaction medium. However, the person skilled in the art can derive from WO-A 2008/013731 (page 10; Examples C1 to 6) and WO-A 2006/103214, paragraph [42] the teaching that carbon dioxide deactivates the DMC catalyst: In this respect, the person skilled in the art would not regard a reaction step in which the catalyst is first brought into contact with at least a partial amount of carbon dioxide before, after some time, it is brought into contact with alkylene oxide for the first time, as a step for activating the DMC catalyst (see in this connection also Example 13 (comparison), in which activation of the DMC catalyst could not be detected (no hotspot) after addition of the carbon dioxide, a waiting time of 20 minutes and subsequent addition of propylene oxide).

US-A 2006/0223973, or WO-A 2006/103214, discloses a process for the preparation of polyether carbonate polyols in which the resulting structure of the polyether carbonate polyol is regulated. US-A 2006/0223973 discloses the removal of "free" water by a vacuum of 10 mm Hg (13 mbar) and temperatures 100° C. and the removal of water bound to the catalyst surface by addition of a compound which reacts with water (e.g. an alkylene oxide compound). US-A 2006/0223973 additionally discloses that the addition of the alkylene oxide compound to the DMC catalyst can take place once or several times. In the examples, a single activation step is carried out in each case by using, for example in the case of the general procedure for implementation on a small scale, the partial amount of 5 g of the total amount of 175 g of propylene oxide to activate the DMC catalyst and, in the case of the general procedure for implementation on a large scale, the partial amount of 200 g of the total amount of 2700 g of propylene oxide to activate the DMC catalyst. The greatest value of $CO_2$ incorporated into the polyether carbonate polyol that was obtained was 18.6 wt. % $CO_2$ (Example 9, given as 23.8 wt. % $CO_3$), a disadvantageously high polydispersity of 6.8 being achieved, however. US-A 2003/149232 also discloses a process for the preparation of polyether carbonate polyols wherein, for activation of the DMC catalyst, an activation step is carried out, for example by using a single time an addition of the partial amount of 5 g of the total amount of 175 g of propylene oxide to activate the DMC catalyst at 130° C. When evaluating the processes disclosed in US-A 2003/149232 or US-A 2006/0223973, the following is to be noted: Within the scope of the present invention, an activation step requires the addition of the alkylene oxide compound to be interrupted, a temperature peak ("hotspot") and/or a pressure drop being observed in the reactor owing to a subsequent exothermic chemical reaction. Therefore, a metered addition of alkylene oxide which is continued for the copolymerisation without being interrupted is not to be regarded as an activation step within the scope of the present invention.

DE-A 10 2008 000 478 discloses a process for the preparation of polyether carbonate polyols wherein, for activation of the DMC catalyst, a partial amount of from 0.1 to 20 wt. % (based on the total amount of alkylene oxide compounds) of one or more alkylene oxide compounds is added once to the mixture of DMC catalyst and starter compound. The subsequent copolymerisation takes place at pressures from 0 to 20 bar and at a temperature of from 60 to 150° C. In the individual process steps according to DE-A 10 2008 000 478, alkylene oxide is metered in continuously (i.e. without interruption). Accordingly, the process is different in that, according to DE-A 10 2008 000 478, the metered addition of alkylene oxide to activate the DMC catalyst takes place without interruption. US-A 2008/0021154, or WO-A 2008/013731, discloses a process for the preparation of polyether carbonate polyols wherein, for activation of the DMC catalyst, a partial amount of 53 g of the total amount of 1151 g of propylene oxide is added once to the mixture of DMC catalyst and starter compound at 130° C. and wherein the addition of the propylene oxide to activate the catalyst takes place in vacuo. When the pressure had risen and then fallen again by 50%, the reaction temperature was adjusted, carbon dioxide was applied to the reactor, and 1098 g of propylene oxide were fed in continuously for copolymerisation.

WO-A 2008/058913 discloses a process for the preparation of polyether carbonate polyols wherein the addition of carbon dioxide can take place before, after or at the same time as the addition of the alkylene oxide compound to the mixture of starter compound and DMC catalyst, wherein in a particular embodiment, for activation of the DMC catalyst, a partial amount of from 0.1 to 20 wt. % (based on the total amount of alkylene oxide compounds) of one or more alkylene oxide compounds is metered into the mixture of DMC catalyst and starter compound once. In the preparation processes of this application that are disclosed in the examples, polyether carbonate polyols having a content of incorporated carbon dioxide of less than 10 wt. % (based on $CO_2$) and relatively high values for the dispersity of >1.5 are obtained.

It was, therefore, an object of the present invention to provide a process for the preparation of polyether carbonate polyols which both leads to a high content of incorporated $CO_2$ and at the same time effects advantageous selectivity (i.e. low ratio of cyclic carbonate to linear polyether carbonate) and low polydispersity of the resulting polyether carbonate polyol. Furthermore, it is to be possible to operate the process safely without temperature peaks ("hotspots") occurring spontaneously, that is to say unintentionally, during the reaction.

Surprisingly, it has been found that the object according to the invention is achieved by a process for the preparation of polyether carbonate polyols from one or more H-functional starter substances, one or more alkylene oxides and carbon dioxide in the presence of a DMC catalyst, characterised in that (α) the H-functional starter substance, or a mixture of at least two H-functional starter substances, is placed in a reaction vessel and optionally water and/or other readily volatile compounds are removed by elevated temperature and/or reduced pressure ("drying"), wherein the DMC catalyst is added to the H-functional starter substance, or the mixture of at least two H-functional starter substances, before or after the drying, (β) for activation (β1) in a first activation step, a first partial amount (based on the total amount of the amount of alkylene oxides used in the activation and copolymerisation) of one or more alkylene oxides is added to the mixture resulting from step (α), wherein this addition of the partial amount of alkylene oxide can optionally take place in the presence of $CO_2$ but preferably takes place in the absence of $CO_2$, and wherein a waiting period is then observed until the temperature peak ("hotspot") that occurs as a result of the subsequent exothermic chemical reaction, and/or a pressure drop in the reactor occurs, (β2) in a second activation step, after the temperature peak reached in the preceding activation step, a second partial amount (based on the total amount of the amount of alkylene oxides used in the activation and copolymerisation) of one or more alkylene oxides is added to the mixture resulting from the preceding activation step, wherein this addition of the partial amount of alkylene oxide can optionally take place in the presence of $CO_2$ but preferably takes place in the absence of $CO_2$, and wherein a waiting period is the observed until the temperature peak ("hotspot") that occurs as a result of the subsequent exothermic chemical reaction, and/or a pressure drop in the reactor occurs, (β3) optionally in a third activation step, or further activation steps, after the temperature peak reached in the preceding activation step, step (β2) is repeated from zero to five times, preferably from one to four times, particularly preferably exactly once, wherein this addition of the partial amount, or these additions of the partial amounts, of alkylene oxide take(s) place in the absence of $CO_2$, and wherein a waiting period is then observed until the temperature peak ("hotspot") that occurs as a result of the subsequent exothermic chemical reaction, and/or a pressure drop in the reactor occurs, (β4) optionally in a further activation step, or further activation steps, after the temperature peak reached in the preceding activation step, step (β3) is repeated from one to five times, preferably from one to four times, particularly preferably exactly once, wherein this addition of the partial amount, or these additions of the partial amounts, of alkylene oxide take(s) place in the presence of $CO_2$, and wherein a waiting time is then observed until the temperature peak ("hotspot") that occurs as a result of the subsequent exothermic chemical reaction, and/or a pressure drop in the reactor occurs, (γ) one or more alkylene oxides and carbon dioxide are metered continuously into the mixture resulting from step (β) ("copolymerisation"). The alkylene oxides used for the copolymerisation can be the same as or different from the alkylene oxides used in the activation.

In a preferred embodiment, the partial amount of one or more alkylene oxides used in the activation in steps β1 to β4 is in each case from 2.0 to 15.0 wt. %, preferably from 2.5 to 14.0 wt. %, particularly preferably from 3.0 to 13.0 wt. % (based on the total amount of the amount of alkylene oxides used in the activation and copolymerisation).

Step (α):

For the preparation of polyether carbonate polyols by catalytic addition of alkylene oxides (epoxides) and carbon dioxide to H-functional starter substances (starters) in the presence of the DMC catalysts according to the invention, the H-functional starter substance, or a mixture of at least two H-functional starter substances, is placed in a reaction vessel. Optionally in step (α)

(α1) the H-functional starter substance, or a mixture of at least two H-functional starter substances, is placed in a reaction vessel and (β2) the temperature of the starter substance or of the mixture is brought to from 50 to 200° C., preferably from 80 to 160° C., particularly preferably from 100 to 140° C., and/or the pressure in the reactor is reduced to less than 500 mbar, preferably from 5 mbar to 100 mbar. A stream of nitrogen can also be passed through the reactor.

The double metal cyanide catalyst can be added to the H-functional starter substance, or to the mixture of at least two H-functional starter substances, in step (α1) or immediately thereafter in step (α2).

The DMC catalyst be added in solid form or in the form of a suspension in an H-functional starter substance. If the catalyst is added in the form of a suspension, it is preferably added to the H-functional starter substance(s) in step (α1).

Step (β):

The metered addition of one or more alkylene oxides and optionally of the carbon dioxide takes place after drying of a starter substance or of the mixture of a plurality of starter substances and after the addition of the DMC catalyst, which is added in the form of a solid or in the form of a suspension before or after drying of the starter substance. If the DMC catalyst is added after drying of the starter substance, the DMC catalyst should preferably be dried, for example in an analogous process to the drying of the starter substance. The metered addition of one or more alkylene oxides and of the carbon dioxide can in principle take place in different ways. The start of the metered addition can take place from the vacuum or at a previously chosen preliminary pressure. The preliminary pressure is preferably established by passing in an inert gas such as, for example, nitrogen, the pressure (absolute) being set at from 10 mbar to 10 bar, preferably from 100 mbar to 8 bar and more preferably from 500 mbar to 6 bar. In a particularly preferred embodiment, the mixture of one or more starter compounds and the DMC catalyst resulting from step (α) is subjected at a temperature of from 100° C. to 130° C. at least once, preferably three times, to an inert gas pressure (nitrogen or a noble gas such as, for example, argon) of from 1.5 bar to 10 bar (absolute), particularly preferably from 3 bar to 6 bar (absolute), and immediately thereafter, within a period of up to 15 minutes, the excess pressure is in each case reduced to about 1 bar (absolute). Alternatively, in an embodiment which is likewise particularly preferred, inert gas (nitrogen or a noble gas such as, for example, argon) is passed at a temperature of from 40° C. to 150° C. into the mixture of one or more starter compounds and the DMC catalyst resulting from step (α) and at the same time a reduced pressure (absolute) of from 10 mbar to 800 mbar, particularly preferably from 50 mbar to 200 mbar, is applied.

Step (γ):

The metered addition of one or more alkylene oxides and of the carbon dioxide can take place simultaneously or sequentially, it being possible for the entire amount of carbon dioxide to be added at once or in a metered manner over the reaction time. A metered addition of the carbon dioxide is preferably carried out. The metered addition of one or more alkylene oxides takes place simultaneously or sequentially with the metered addition of the carbon dioxide. If a plurality of alkylene oxides are used in the synthesis of the polyether carbonate polyols, then the metered addition thereof can take place simultaneously or sequentially via separate metered additions (additions) or via one or more metered additions, at least two alkylene oxides being metered in as a mixture. Via the nature of the metered addition of the alkylene oxides and of the carbon dioxide it is possible to synthesise random, alternating, block-like or gradient-like polyether carbonate polyols. The concentration of free alkylene oxides during the reaction in the reaction mixture is preferably from >0 to 40 wt. %, particularly preferably from >0 to 25 wt. %, most preferably from >0 to 15 wt. % (in each case based on the weight of the reaction mixture).

Preferably, an excess of carbon dioxide, based on the calculated amount of incorporated carbon dioxide in the polyether carbonate polyol, is used because an excess of carbon dioxide is advantageous due to the slowness of carbon dioxide to react. The amount of carbon dioxide can be established via the total pressure under the reaction conditions in question. The range from 0.01 to 120 bar, preferably from 0.1 to 110 bar, particularly preferably from 1 to 100 bar, has been found to be advantageous as the total pressure (absolute) for the copolymerisation for the preparation of the polyether carbonate polyols. For the process according to the invention it has further been shown that the copolymerisation for the preparation of the polyether carbonate polyols is advantageously carried out at from 50 to 150° C., preferably at from 60 to 145° C., particularly preferably at from 70 to 140° C. and most particularly preferably at from 90 to 130° C. If temperatures below 50° C. are set, the reaction comes to a halt. At temperatures above 150° C., the amount of undesirable secondary products increases considerably. It is further to be ensured when choosing the pressure and temperature that the $CO_2$ as far as possible changes from the gaseous state to the liquid and/or supercritical liquid state. $CO_2$ can, however, also be added to the reactor in the form of a solid and then change into the liquid and/or supercritical liquid state under the chosen reaction conditions.

Particularly preferred reactors are: tubular reactor, stirrer vessel, loop reactor. Polyether polycarbonate polyols can be prepared in a stirrer vessel, the stirrer vessel being cooled, according to the design and mode of operation, via the reactor jacket, internal cooling surfaces and/or cooling surfaces located in a pump circuit. For safety reasons, the content of free epoxide should not exceed 15 wt. % in the reaction mixture of the stirrer vessel (see, for example, WO-A 2004/081082; page 3; line 14). Attention is therefore to be paid particularly to the metering rate of the epoxide both in semibatch operation, where the product is not removed until the end of the reaction, and in continuous operation, where the product is removed continuously. The metering rate of the epoxide is to be so adjusted that the epoxide reacts completely sufficiently quickly despite the inhibiting effect of the carbon dioxide. It is possible to supply the carbon dioxide continuously or discontinuously. This depends whether the epoxide is consumed quickly enough and whether the product is optionally to contain $CO_2$-free polyether blocks. The amount of carbon dioxide (indicated as pressure) can likewise vary during the addition of the epoxide. It is possible gradually to increase the $CO_2$ pressure during the addition of the epoxide or to lower it or leave it the same.

A further possible embodiment in the stirrer vessel for the copolymerisation (step γ) is characterised in that one or more H-functional starter compounds are metered into the reactor continuously during the reaction. The amount of H-functional starter compounds metered into the reactor continuously during the reaction is preferably at least 20 mol % equivalents, particularly preferably from 70 to 95 mol % equivalents (in each case based on the total amount of H-functional starter compounds).

The activated catalyst/starter mixture can be (further) copolymerised with epoxide and carbon dioxide in the stirrer vessel or in a different reaction vessel (tubular reactor or loop reactor).

In the case of a tubular reactor, the activated catalyst and the starter as well as the epoxide and carbon dioxide are pumped continuously through a tube. The molar ratios of the reactants vary according to the polymer that is desired. In a preferred embodiment, carbon dioxide is metered in in its supercritical form, that is to say virtually liquid form, in order to permit better miscibility of the components. There are advantageously fitted mixing elements for better mixing of the reactants, as are marketed, for example, by Ehrfeld Mikrotechnik BTS GmbH, or mixer/heat exchanger elements, which improve mixing and heat dissipation at the same time.

Even loop reactors can be used for the preparation of polyether polycarbonate polyols. In general, these include reactors with material recycling, such as, for example, a jet loop reactor, which can also be operated continuously, or a loop of tubular reactors. The use of a loop reactor is particularly advantageous because backmixing can be carried out here, so that the epoxide concentration should be low. In order to achieve complete conversion, a tube ("dwell tube") is frequently provided downstream.

The polyether carbonate polyols obtained according to the invention have a functionality of at least 1, preferably from 1 to 8, particularly preferably from 1 to 6 and most particularly preferably from 2 to 4. The molecular weight is preferably from 400 to 10,000 g/mol and particularly preferably from 500 to 6000 g/mol.

In general, alkylene oxides (epoxides) having from 2 to 24 carbon atoms can be used for the process according to the invention. Alkylene oxides having from 2 to 24 carbon atoms are, for example, one or more compounds selected from the group consisting of ethylene oxide, propylene oxide, 1-butene oxide, 2,3-butene oxide, 2-methyl-1,2-propene oxide (isobutene oxide), 1-pentene oxide, 2,3-pentene oxide, 2-methyl-1,2-butene oxide, 3-methyl-1,2-butene oxide, 1-hexene oxide, 2,3-hexene oxide, 3,4-hexene oxide, 2-methyl-1,2-pentene oxide, 4-methyl-1,2-pentene oxide, 2-ethyl-1,2-butene oxide, 1-heptene oxide, 1-octene oxide, 1-nonene oxide, 1-decene oxide, 1-undecene oxide, 1-dodecene oxide, 4-methyl-1,2-pentene oxide, butadiene monoxide, isoprene monoxide, cyclopentene oxide, cyclohexane oxide, cycloheptene oxide, cyclooctene oxide, styrene oxide, methylstyrene oxide, pinene oxide, mono- or poly-epoxidised fats as mono-, di- and tri-glycerides, epoxidised fatty acids, $C_1$-$C_{24}$-esters of epoxidised fatty acids, epichlorohydrin, glycidol and derivatives of glycidol such as, for example, methyl glycidyl ether, ethyl glycidyl ether, 2-ethylhexyl glycidyl ether, allyl glycidyl ether, glycidyl methacrylate as well as epoxide-functional alkoxysilanes such as, for example, 3-glycidyloxypropyltrimethoxysilane, 3-glycidyloxypropyltriethoxysilane, 3-glycidyloxypropyl-tripropoxysilane, 3-glycidyloxypropyl-methyl-dimethoxysilane, 3-glycidyloxypropyl-ethyldiethoxy-silane. 3-glycidyloxypropyltriisopropoxysilane. Ethylene oxide and/or propylene oxide, in particular propylene oxide, are preferably used as the alkylene oxides.

There can be used as the suitable H-functional starter substance compounds having H atoms active for the alkoxylation. Groups which have active H atoms and which are active for the alkoxylation are, for example, —OH, —$NH_2$ (primary amines), —NH— (secondary amines), —SH and —$CO_2H$; —OH and —$NH_2$ are preferred; —OH is particularly preferred. There is used as the H-functional starter substance, for example, one or more compounds selected from the group consisting of mono- or poly-hydric alcohols, polyvalent amines, polyvalent thiols, aminoalcohols, thioalcohols, hydroxy esters, polyether polyols, polyester polyols, polyester ether polyols, polyether carbonate polyols, polycarbonate polyols, polycarbonates, polyethyleneimines, polyether amines (e.g. so-called Jeffamine® from Huntsman, such as, for example, D-230, D-400, D-2000, T-403, T-3000, T-5000 or corresponding products from BASF, such as, for example, polyether amine D230, D400, D200, T403, T5000), polytetrahydrofurans (e.g. PolyTHF® from BASF, such as, for example, PolyTHF® 250, 650S, 1000, 1000S, 1400, 1800, 2000), polytetrahydrofuranamines (BASF product polytetrahydrofuranamine 1700), polyether thiols, polyacrylate polyols, castor oil, the mono- or di-glyceride of ricinoleic acid, monoglycerides of fatty acids, chemically modified mono-, di- and/or tri-glycerides of fatty acids, and $C_1$-$C_{24}$-alkyl fatty acid esters that contain on average at least 2 OH groups per molecule. The $C_1$-$C_{24}$-alkyl fatty acid esters that contain on average at least 2 OH groups per molecule are, for example, commercial products such as Lupranol Balance® (BASF AG), Merginol® types (Hobum Oleochemicals GmbH), Sovermol® types (Cognis Deutschland GmbH & Co. KG) and Soyol®™ types (USSC Co.).

There can be used as monofunctional starter compounds alcohols, amines, thiols and carboxylic acids. There can be used as monofunctional alcohols: methanol, ethanol, 1-propanol, 2-propanol, 1-butanol, 2-butanol, tert-butanol, 3-buten-1-ol, 3-butyn-1-ol, 2-methyl-3-buten-2-ol, 2-methyl-3-butyn-2-ol, propargyl alcohol, 2-methyl-2-propanol, 1-tert-butoxy-2-propanol, 1-pentanol, 2-pentanol, 3-pentanol, 1-hexanol, 2-hexanol, 3-hexanol, 1-heptanol, 2-heptanol, 3-heptanol, 1-octanol, 2-octanol, 3-octanol, 4-octanol, phenol, 2-hydroxybiphenyl, 3-hydroxybiphenyl, 4-hydroxybiphenyl, 2-hydroxypyridine, 3-hydroxypyridine, 4-hydroxypyridine. There are suitable as monofunctional amines: butylamine, tert-butylamine, pentylamine, hexylamine, aniline, aziridine, pyrrolidine, piperidine, morpholine. There can be used as monofunctional thiols: ethanethiol, 1-propanethiol, 2-propanethiol, 1-butanethiol, 3-methyl-1-butanethiol, 2-butene-1-thiol, thiophenol. There may be mentioned as monofunctinoal carboxylic acids: formic acid, acetic acid, propionic acid, butyric acid, fatty acids such as stearic acid, palmitic acid, oleic acid, linoleic acid, linolenic acid, benzoic acid, acrylic acid.

Polyhydric alcohols suitable as H-functional starter substances are, for example, dihydric alcohols (such as, for example, ethylene glycol, diethylene glycol, propylene glycol, dipropylene glycol, 1,3-propanediol, 1,4-butanediol, 1,4-butenediol, 1,4-butynediol, neopentyl glycol, 1,5-pentanediol, methylpentanediols (such as, for example, 3-methyl-1,5-pentanediol), 1,6-hexanediol; 1,8-octanediol, 1,10-decanediol, 1,12-dodecanediol, bis-(hydroxymethyl)-cyclohexanes (such as, for example, 1,4-bis-(hydroxymethyl)cyclohexane), -triethylene glycol, tetraethylene glycol, polyethylene glycols, dipropylene glycol, tripropylene glycol, polypropylene glycols, dibutylene glycol and polybutylene glycols); trihydric alcohols (such as, for example, trimethylolpropane, glycerol, trishydroxyethyl isocyanurate, castor oil); tetrahydric alcohols (such as, for example, pentaerythritol); polyalcohols (such as, for example, sorbitol, hexitol, sucrose, starch, starch hydrolysates, cellulose, cellulose hydrolysates, hydroxy-functionalised fats and oils, in particular castor oil), as well as all modification products of the above-mentioned alcohols with different amounts of ε-caprolactone.

The H-functional starter substances can also be selected from the substance class of the polyether polyols, in particular those having a molecular weight Mn in the range from 100 to 4000 g/mol. Preference is given to polyether polyols that are composed of repeating ethylene oxide and propylene oxide units, preferably having a content of from 35 to 100% propylene oxide units, particularly preferably having a content of from 50 to 100% propylene oxide units. These can be random copolymers, gradient copolymers, alternating or block copolymers of ethylene oxide and propylene oxide. Suitable polyether polyols composed of repeating propylene oxide and/or ethylene oxide units are, for example, the Desmophen®, Acclaim®, Arcol®, Baycoll®, Bayfill®, Bayflex®, Baygal®, PET® and polyether polyols from Bayer MaterialScience AG (such as, for example, Desmophen® 3600Z, Desmophen® 1900U, Acclaim® Polyol 2200, Acclaim® Polyol 40001, Arcol® Polyol 1004, Arcol® Polyol 1010, Arcol® Polyol 1030, Arcol® Polyol 1070, Baycoll® BD 1110, Bayfill® VPPU 0789, Baygal® K55, PET® 1004, Polyether® S180). Further suitable homo-polyethylene oxides are, for example, the Pluriol® E brands from BASF SE, suitable homo-polypropylene oxides are, for example, the Pluriol® P brands from BASF SE, suitable mixed copolymers of ethylene oxide and propylene oxide are, for example, the Pluronic® PE or Pluriol® RPE brands from BASF SE.

The H-functional starter substances can also be selected from the substance class of the polyester polyols, in particular those having a molecular weight Mn in the range from 200 to 4500 g/mol. At least difunctional polyesters are used as polyester polyols. Polyester polyols preferably consist of alternating acid and alcohol units. There are used as acid components, for example, succinic acid, maleic acid, maleic anhydride, adipic acid, phthalic anhydride, phthalic acid, isophthalic acid, terephthalic acid, tetrahydrophthalic acid, tetrahydrophthalic anhydride, hexahydrophthalic anhydride or mixtures of the mentioned acids and/or anhydrides. There are used as alcohol components, for example, ethanediol, 1,2-propanediol, 1,3-propanediol, 1,4-butanediol, 1,5-pentanediol, neopentyl glycol, 1,6-hexanediol, 1,4-bis-(hydroxymethyl)-cyclohexane, diethylene glycol, dipropylene glycol, trimethylolpropane, glycerol, pentaerythritol or mixtures of the mentioned alcohols. If divalent or polyvalent polyether polyols are used as the alcohol component, polyester ether polyols which can likewise be used as starter substances for the preparation of the polyether carbonate polyols are obtained. Preferably, polyether polyols with Mn=from 150 to 2000 g/mol are used for the preparation of the polyester ether polyols.

Polycarbonate diols can further be used as H-functional starter substances, in particular polycarbonate diols having a molecular weight Mn in the range from 150 to 4500 g/mol, preferably from 500 to 2500 g/mol, which are prepared, for example, by reaction of phosgene, dimethyl carbonate, diethyl carbonate or diphenyl carbonate and difunctional alcohols or polyester polyols or polyether polyols. Examples of polycarbonates are to be found, for example, in EP-A 1359177. For example, there can be used as polycarbonate diols the Desmophen® C types from Bayer MaterialScience AG, such as, for example, Desmophen® C 1100 or Desmophen® C 2200.

In a further embodiment of the invention, polyether carbonate polyols can be used as the H-functional starter substances. In particular, polyether carbonate polyols that are obtainable by the process according to the invention described herein are used. These polyether carbonate polyols used as H-functional starter substances are prepared beforehand in a separate reaction step.

The H-functional starter substances generally have a functionality (i.e. number of H atoms active for the polymerisation per molecule) of from 1 to 8, preferably 2 or 3. The H-functional starter substances are used either individually or in the form of a mixture of at least two H-functional starter substances.

Preferred H-functional starter substances are alcohols of the general formula (II)

$$HO-(CH_2)_x-OH \qquad (II)$$

wherein x is a number from 1 to 20, preferably an even number from 2 to 20. Examples of alcohols according to formula (II) are ethylene glycol, 1,4-butanediol, 1,6-hexanediol, 1,8-octanediol, 1,10-decanediol and 1,12-dodecanediol. Further preferred H-functional starter substances are neopentyl glycol, trimethylolpropane, glycerol, pentaerythritol, reaction products of the alcohols according to formula (II) with ε-caprolactone, for example reaction products of trimethylolpropane with ε-caprolactone, reaction products of glycerol with ε-caprolactone, as well as reaction products of pentaerythritol with ε-caprolactone. Further preferred as H-functional starter substances are water, diethylene glycol, dipropylene glycol, castor oil, sorbitol, and polyether polyols composed of repeating polyalkylene oxide units.

Particularly preferably, the H-functional starter substances are one or more compounds selected from the group consisting of ethylene glycol, propylene glycol, 1,3-propanediol, 1,3-butanediol, 1,4-butanediol, 1,5-pentanediol, 2-methyl-1,3-propanediol, neopentyl glycol, 1,6-hexanediol, diethylene glycol, dipropylene glycol, glycerol, trimethylolpropane, di- and tri-functional polyether polyols, the polyether polyol being composed of a di- or tri-H-functional starter substance and propylene oxide or of a di- or tri-H-functional starter substance, propylene oxide and ethylene oxide. The polyether polyols preferably have a molecular weight Mn in the range from 62 to 4500 g/mol and a functionality of from 2 to 3, and in particular a molecular weight Mn in the range from 62 to 3000 g/mol and a functionality of from 2 to 3.

The preparation of the polyether carbonate polyols is carried out by catalytic addition of carbon dioxide and alkylene oxides to H-functional starter substances. Within the scope of the invention, "H-functional" is understood as being the number of H atoms active for the alkoxylation per molecule of the starter compound.

DMC catalysts for use in the homopolymerisation of epoxides are known in principle from the prior art (see e.g. U.S. Pat. Nos. 3,404,109, 3,829,505, 3,941,849 and 5,158,922). DMC catalysts which are described, for example, in U.S. Pat. No. 5,470,813, EP-A 700 949, EP-A 743 093, EP-A 761 708, WO 97/40086, WO 98/16310 and WO 00/47649 have a very high activity in the homopolymerisation of epoxides and permit the preparation of polyether polyols at very low catalyst concentrations (25 ppm or less), so that separation of the catalyst from the finished product is generally no longer required. A typical example is the highly active DMC catalysts described in EP-A 700 949, which contain, in addition to a double metal cyanide compound (e.g. zinc hexacyanocobaltate(III)) and an organic complex ligand (e.g. tert-butanol), also a polyether having a number-average molecular weight greater than 500 g/mol.

The DMC catalysts according to the invention are obtained by
(i) in the first step, reacting an aqueous solution of a metal salt with the aqueous solution of a metal cyanide salt in the presence of one or more organic complex ligands, for example an ether or alcohol,
(ii) wherein in the second step the solid is separated from the suspension obtained from (i) by known techniques (such as centrifugation or filtration),
(iii) wherein optionally in a third step the isolated solid is washed with an aqueous solution of an organic complex ligand (e.g. by being resuspended and then isolated again by filtration or centrifugation),
(iv) wherein the resulting solid, optionally after pulverisation, is then dried at temperatures of generally from 20 to 120° C. and at pressures of generally from 0.1 mbar to normal pressure (1013 mbar),
and wherein in the first step or immediately after the precipitation of the double metal cyanide compound (second step), one or more organic complex ligands, preferably in excess (based on the double metal cyanide compound), and optionally further complex-forming components are added.

The double metal cyanide compounds contained in the DMC catalysts according to the invention are the reaction products of water-soluble metal salts and water-soluble metal cyanide salts.

For example, an aqueous solution of zinc chloride (preferably in excess, based on the metal cyanide salt such as, for example, potassium hexacyanocobaltate) and potassium hexacyanocobaltate is mixed and then dimethoxyethane (glyme) or tert-butanol (preferably in excess, based on zinc hexacyanocobaltate) is added to the resulting suspension.

Metal salts suitable for the preparation of the double metal cyanide compounds preferably have the general formula (III)

wherein
M is selected from the metal cations $Zn^{2+}$, $Fe^{2+}$, $Ni^{2+}$, $Mn^{2+}$, $Co^{2+}$, $Sr^{2+}$, $Sn^{2+}$, $Pb^{2+}$ and $Cu^{2+}$, M is preferably $Zn^{2+}$, $Fe^{2+}$, $Co^{2+}$ or $Ni^{2+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
n is 1 when X=sulfate, carbonate or oxalate, and
n is when X=halide, hydroxide, carboxylate, cyanate, thiocyanate, isocyanate, isothiocyanate or nitrate,
or suitable metal salts have the general formula (IV)

wherein
M is selected from the metal cations $Fe^{3+}$, $Al^{3+}$, $Co^{3+}$ and $Cr^{3+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;

r is 2 when X=sulfate, carbonate or oxalate, and
r is 1 when X=halide, hydroxide, carboxylate, cyanate, thiocyanate, isocyanate, isothiocyanate or nitrate,
or suitable metal salts have the general formula (V)

wherein
M is selected from the metal cations $Mo^{4+}$, $V^{4+}$ and $W^{4+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
s is 2 when X=sulfate, carbonate or oxalate, and
s is 4 when X=halide, hydroxide, carboxylate, cyanate, thiocyanate, isocyanate, isothiocyanate or nitrate,
or suitable metal salts have the general formula (VI)

wherein
M is selected form the metal cations $Mo^{6+}$ and $W^{6+}$,
X are one or more (i.e. different) anions, preferably an anion selected from the group of the halides (i.e. fluoride, chloride, bromide, iodide), hydroxide, sulfate, carbonate, cyanate, thiocyanate, isocyanate, isothiocyanate, carboxylate, oxalate and nitrate;
t is 3 when X=sulfate, carbonate or oxalate, and
t is 6 when X=halide, hydroxide, carboxylate, cyanate, thiocyanate, isocyanate, isothiocyanate or nitrate.

Examples of suitable metal salts are zinc chloride, zinc bromide, zinc iodide, zinc acetate, zinc acetylacetonate, zinc benzoate, zinc nitrate, iron(II) sulfate, iron(II) bromide, iron (II) chloride, iron(III) chloride, cobalt(II) chloride, cobalt(II) thiocyanate, nickel(II) chloride and nickel(II) nitrate. Mixtures of different metal salts can also be used.

Metal cyanide salts suitable for the preparation of the double metal cyanide compounds preferably have the general formula (VII)

wherein
M' is selected from one or more metal cations from the group consisting of Fe(II), Fe(III), Co(II), Co(III), Cr(II), Cr(III), Mn(II), Mn(III), Ir(III), Ni(II), Rh(III), Ru(II), V(IV) and V(V), M' is preferably one or more metal cations from the group consisting of Co(II), Co(III), Fe(II), Fe(III), Cr(III), Ir(III) and Ni(II),
Y is selected from one or more metal cations from the group consisting of alkali metal (i.e. $Li^+$, $Na^+$, $K^+$, $Rb^+$) and alkaline earth metal (i.e. $Be^{2+}$, $Mg^{2+}$, $Ca^{2+}$, $Sr^{2+}$, $Ba^{2+}$),
A is selected from one or more anions from the group consisting of halides (i.e. fluoride, chloride, bromide, iodide), hydroxide, sulfate, carbonate, cyanate, thiocyanate, isocyanate, isothiocyanate, carboxylate, azide, oxalate or nitrate, and
a, b and c are integers, the values for a, b and c being so chosen that the electroneutrality of the metal cyanide salt is given; a is preferably 1, 2, 3 or 4; b is preferably 4, 5 or 6; c preferably has the value 0.

Examples of suitable metal cyanide salts are sodium hexacyanocobaltate(III), potassium hexacyanocobaltate(III), potassium hexacyanoferrate(II), potassium hexacyanoferrate (III), calcium hexacyanocobaltate(III) and lithium hexacyanocobaltate(III).

Preferred double metal cyanide compounds which are contained in the DMC catalysts according to the invention are compounds of the general formula (VIII)

$$M_x[M'_{x'}(CN)_y]_z \quad \text{(VIII)},$$

wherein M is as defined in formulae (III) to (VI) and
M' is as defined in formula (VII), and
x, x', y and z are integers and are so chosen that the electroneutrality of the double metal cyanide compound is given. Preferably,
x=3, x'=1, y=6 and z=2,
M=Zn(II), Fe(II), Co(II) or Ni(II) and
M'=Co(III), Fe(III), Cr(III) or Ir(III).

Examples of suitable double metal cyanide compounds a) are zinc hexacyanocobaltate(III), zinc hexacyanoiridate(III), zinc hexacyanoferrate(III) and cobalt(II) hexacyanocobaltate (III). Further examples of suitable double metal cyanide compounds are to be found, for example, in U.S. Pat. No. 5,158,922 (column 8, lines 29-66). Zinc hexacyanocobaltate(III) is particularly preferably used.

The organic complex ligands added in the preparation of the DMC catalysts are disclosed, for example, in U.S. Pat. No. 5,158,922 (see in particular column 6, lines 9 to 65), U.S. Pat. Nos. 3,404,109, 3,829,505, 3,941,849, EP-A 700 949, EP-A 761 708, JP 4 145 123, U.S. Pat. No. 5,470,813, EP-A 743 093 and WO-A 97/40086). For example, there are used as organic complex ligands water-soluble, organic compounds with heteroatoms, such as oxygen, nitrogen, phosphorus or sulfur, which are able to form complexes with the double metal cyanide compound. Preferred organic complex ligands are alcohols, aldehydes, ketones, ethers, esters, amides, ureas, nitriles, sulfides and mixtures thereof. Particularly preferred organic complex ligands are aliphatic ethers (such as dimethoxyethane), water-soluble, aliphatic alcohols (such as ethanol, isopropanol, n-butanol, isobutanol, sec-butanol, tert-butanol, 2-methyl-3-buten-2-ol and 2-methyl-3-butyn-2-ol), compounds which contain both aliphatic or cycloaliphatic ether groups and also aliphatic hydroxyl groups (such as, for example, ethylene glycol mono-tert-butyl ether, diethylene glycol, mono-tert-butyl ether, tripropylene glycol monomethyl ether and 3-methyl-3-oxetan-methanol). Most preferred organic complex ligands are selected from one or more compounds from the group consisting of dimethoxyethane, tert-butanol, 2-methyl-3-buten-2-ol, 2-methyl-3-butyn-2-ol, ethylene glycol mono-tert-butyl ether and 3-methyl-3-oxetan-methanol.

In the preparation of the DMC catalysts according to the invention there are optionally used one or more complex-forming component(s) from the compound classes of the polyethers, polyesters, polycarbonates, polyalkylene glycol sorbitan esters, polyalkylene glycol glycidyl ethers, polyacrylamide, poly(acrylamide-co-acrylic acid), polyacrylic acid, poly(acrylic acid-co-maleic acid), polyacrylonitrile, polyalkyl acrylates, polyalkyl methacrylates, polyvinyl methyl ether, polyvinyl ethyl ether, polyvinyl acetate, polyvinyl alcohol, poly-N-vinylpyrrolidone, poly(N-vinylpyrrolidone-co-acrylic acid), polyvinyl methyl ketone, poly(4-vinylphenol), poly(acrylic acid-co-styrene), oxazoline polymers, polyalkyleneimines, maleic acid and maleic anhydride copolymers, hydroxyethylcellulose and polyacetals, or of the glycidyl ethers, glycosides, carboxylic acid esters of polyhydric alcohols, gallic acids or salts, esters or amides thereof, cyclodextrins, phosphorus compounds, α,β-unsaturated carboxylic acid esters or ionic surface-active compounds.

In the preparation of the DMC catalysts according to the invention there are preferably reacted in the first step the aqueous solutions of the metal salt (e.g. zinc chloride), used in stoichiometric excess (at least 50 mol %) based on metal cyanide salt, that is to say at least a molar ratio of metal salt to metal cyanide salt of from 2.25 to 1.00), and of the metal cyanide salt (e.g. potassium hexacyanocobaltate) in the presence of the organic complex ligand (e.g. tert-butanol), there being formed a suspension which contains the double metal cyanide compound (e.g. zinc hexacyanocobaltate), water, excess metal salt, and the organic complex ligand.

The organic complex ligand can be present in the aqueous solution of the metal salt and/or of the metal cyanide salt, or it is added directly to the suspension obtained after precipitation of the double metal cyanide compound. It has been found to be advantageous to mix the aqueous solutions of the metal salt and of the metal cyanide salt, and the organic complex ligand with vigorous stirring. Optionally, the suspension formed in the first step is then treated with a further complex-forming component. The complex-forming component is preferably used in a mixture with water and organic complex ligand. A preferred process for carrying out the first step (i.e. the preparation of the suspension) is carried out using a mixing nozzle, particularly preferably using a jet disperser as described in WO-A 01/39883.

In the second step, the solid (i.e. the precursor of the catalyst according to the invention) is isolated from the suspension by known techniques, such as centrifugation or filtration.

In a preferred variant, the isolated solid is then washed in a third process step with an aqueous solution of the organic complex ligand (e.g. by being resuspended and then isolated again by filtration or centrifugation). In this manner, water-soluble secondary products, for example, such as potassium chloride, can be removed from the catalyst according to the invention. Preferably, the amount of organic complex ligand in the aqueous wash solution is from 40 to 80 wt. %, based on the total solution.

Optionally, further complex-forming component, preferably in the range from 0.5 to 5 wt. %, based on the total solution, is added to the aqueous wash solution in the third step.

It is additionally advantageous to Wash the isolated solid more than once. Preferably, the solid is washed in a first washing step (iii-1) with an aqueous solution of the unsaturated alcohol (e.g. by being resuspended and then isolated again by filtration or centrifugation) in order thus to remove, for example, water-soluble secondary products, such as potassium chloride, from the catalyst according to the invention. Particularly preferably, the amount of unsaturated alcohol in the aqueous wash solution is from 40 to 80 wt. %, based on the total solution of the first washing step. In the further washing steps (iii-2), either the first washing step is repeated once or several times, preferably from one to three times, or, preferably, a non-aqueous solution, such as, for example, a mixture or solution of unsaturated alcohol and further complex-forming component (preferably in the range from 0.5 to 5 wt. %, based on the total amount of the wash solution of step (iii-2)), is used as the wash solution and the solid is washed therewith once or several times, preferably from one to three times.

The isolated and optionally washed solid is then, optionally after pulverisation, dried at temperatures of generally from 20 to 100° C. and at pressures of generally from 0.1 mbar to normal pressure (1013 mbar).

A preferred process for isolating the DMC catalysts according to the invention from the suspension by filtration, filter cake washing and drying is described in WO-A 01/80994.

The polyether carbonate polyols obtainable by the process according to the invention have a low content of secondary products and can be processed without difficulty, in particular by reaction with di- and/or poly-isocyanates to polyurethanes, in particular flexible polyurethane foams. For polyurethane applications, polyether carbonate polyols based on an H-functional starter compound having a functionality of at least 2 are preferably used. The polyether carbonate polyols obtainable by the process according to the invention can further be used in applications such as washing and cleaning agent formulations, drilling fluids, fuel additives, ionic and non-ionic surfactants, lubricants, process chemicals for paper or textile production, or cosmetic formulations. It is known to the person skilled in the art that, depending on the field of application in question, the polyether carbonate polyols to be used must satisfy particular material properties such as, for example, molecular weight, viscosity, polydispersity, functionality and/or hydroxyl number.

EXAMPLES

The weight- and number-average molecular weight of the resulting polymers was determined by means of gel permeation chromatography (GPC). The procedure according to DIN 55672-1: "Gelpermeationschromatographie, Teil 1-Tetrahydrofuran als Elutionsmittel" was followed. Polystyrene of known molar mass was used for calibration.

The OH number (hydroxyl number) was determined on the basis of DIN 53240-2, but pyridine was used as solvent instead of THF/dichloromethane. Titration was carried out with 0.5 molar ethanolic KOH (end point recognition by means of potentiometry). Castor oil with certified OH number was used as test substance. The indication of the unit in "mg/g" refers to mg [KOH]/g [polyether carbonate polyol].

The amount of incorporated $CO_2$ in the resulting polyether carbonate polyol, and the ratio of propylene carbonate to polyether carbonate polyol, were determined by means of $^1$H-NMR (Bruker, DPX 400, 400 MHz; pulse program zg30, waiting time d1: 10 s, 64 scans). The sample was dissolved in each case in deuterated chloroform. The relevant resonances in the $^1$H-NMR (based on TMS=0 ppm) are as follows:

cyclic carbonate (which was formed as secondary product) resonance at 4.5 ppm, carbonate, resulting from carbon dioxide incorporated in the polyether carbonate polyol (resonances at 5.1 to 4.8 ppm), unreacted PO with resonance at 2.4 ppm, polyether polyol (i.e. without incorporated carbon dioxide) with resonances at 1.2 to 1.0 ppm, the 1,8-octanediol incorporated as starter molecule with a resonance at 1.6 to 1.52 ppm.

The molar amount of carbonate incorporated in the polymer in the reaction mixture is calculated according to formula (IX) as follows, wherein the following abbreviations are used:

F(4.5)=resonance area at 4.5 ppm for cyclic carbonate (corresponds to an H atom)

F(5.1-4.8)=resonance area at 5.1-4.8 ppm for polyether carbonate polyol and an H atom for cyclic carbonate F(2.4)=resonance area at 2.4 ppm for free, unreacted PO F(1.2-1.0)=resonance area at 1.2-1.0 ppm for polyether polyol F(1.6-1.52)=resonance area at 1.6 to 1.52 ppm for 1,8-octanediol (starter)

Taking into account the relative intensities, the polymer-bonded carbonate ("linear carbonate" LC) in the reaction mixture was converted to mol % according to the following formula (IX):

$$LC = \frac{F(5.1-4.8) - F(4.5)}{F(5.1-4.8) + F(2.4) + 0.33 * F(1.2-1.0) + 0.25 * F(1.6-1.52)} * 100 \quad \text{(IX)}$$

The amount by weight (in wt. %) of polymer-bonded carbonate (LC') in the reaction mixture was calculated according to formula (X):

$$LC' = \frac{[F(5.1-4.8) - F(4.5)] * 102}{N} * 100\% \quad \text{(X)}$$

wherein the value for N ("denominator" N) is calculated according to formula (XI):

N=[F(5.1−4.8)−F(4.5)]*102+F(4.5)*102+F(2.4)*58+ 0.33*F(1.2−1.0)*58+0.25*F(1.6−1.52)*146 (XI)

The factor 102 results from the sum of the molar masses of $CO_2$ (molar mass 44 g/mol) and of propylene oxide (molar mass 58 g/mol), the factor 58 results from the molar mass of propylene oxide, and the factor 146 results from the molar mass of the starter used, 1,8-octanediol.

The amount by weight (wt. %) of cyclic carbonate (CC') in the reaction mixture was calculated according to formula (XII):

$$CC' = \frac{F(4.5) * 102}{N} * 100\% \quad \text{(XII)}$$

wherein the value for N is calculated according to formula (XI).

In order to calculate from the values of the composition of the reaction mixture the composition based on the polymer component (consisting of polyether polyol, which was composed of starter and propylene oxide during the activation steps carried out under $CO_2$-free conditions, and polyether carbonate polyol, composed of starter, propylene oxide and carbon dioxide during the activation steps carried out in the presence of $CO_2$ and during the copolymerisation), the non-polymer constituents of the reaction mixture (i.e. cyclic propylene carbonate as well as any unreacted propylene oxide present) were eliminated by calculation. The amount by weight of the carbonate repeating units in the polyether carbonate polyol was converted to an amount by weight of carbon dioxide by means of the factor F=44/(44+58). The indication of the $CO_2$ content in the polyether carbonate polyol ("incorporated $CO_2$"; see following examples and Table 1) is normalised to the proportion of the polyether carbonate polyol molecule that was formed in the copolymerisation and optionally the activation steps in the presence of $CO_2$ (i.e. the proportion of the polyether carbonate polyol molecule, which results from the starter (1,8-octanediol) and from the reaction of the starter with epoxide, that was added under $CO_2$-free conditions was not taken into account here).

H-functional starter compounds used:
1,8-octanediol Sigma Aldrich
PET-1 Polyether polyol having an OH number of about 235 mg KOH/g, prepared by addition of propylene oxide to glycerol as starter compound.

Example 1

Preparation of a Polyether Carbonate Polyol
(According to the Invention)

141 mg of dried DMC catalyst (prepared according to Example 6 of WO-A 01/80994) and 51 g of dried 1,8-octanediol (starter) were placed in a 1-litre pressurised reactor with a gas-metering device. The reactor was heated to 130° C. and rendered inert by repeated application of nitrogen to about 5 bar and subsequent pressure reduction to about 1 bar. This procedure was carried out 3 times. 25 g of propylene oxide (PO) [PO amount 1] were metered into the reactor at 130° C. [temperature 1] and, in the case of the examples according to the invention, in the absence of $CO_2$, that is to say at zero bar $CO_2$ (or, in the case of comparison examples, the pressure indicated in Table 1) [$CO_2$ pressure 1]. The beginning of the reaction was marked by a temperature peak ("hotspot") and by a pressure drop to the starting pressure (about 1 bar). After the first pressure drop, 20 g of PO [PO amount 2] and then 19 g of PO [PO amount 3] were quickly metered in, as a result of which a temperature peak and a pressure drop occurred in each case. After 50 bar $CO_2$ [$CO_2$ pressure 2] had been applied to the reactor, 50 g of PO [PO amount 4] were quickly metered in, a temperature peak occurring after a waiting time of 33 minutes {time 1}. At the same time, the carbon dioxide $CO_2$ pressure started to fall. The pressure was so controlled that further $CO_2$ was added when it fell below the desired value. Only then was the remaining propylene oxide (435 g) [PO remainder] pumped continuously into the reactor at about 1.8 g/minute, while the temperature was lowered to 105° C. in steps of 5° C. per five minutes. When the PO addition was complete, stirring (1500 rpm) was carried out for a further 60 minutes at 105° C. and the pressure indicated above.

The polyether carbonate polyol so prepared is distinguished by the following properties:
incorporated $CO_2$ [wt. %], based on the portion of the polymer formed under $CO_2$: 19.9 wt. %;
selectivity, indicated as the ratio of cyclic carbonate (undesirable secondary product) to polyether carbonate polyol=0.21;
the OH number was 67.2 mg/g;
polydispersity 1.45.

Example 2

Preparation of a Polyether Carbonate Polyol (Comparison Example)

The procedure was carried out according to Example 1, except that [$CO_2$ pressure 1]=[$CO_2$ pressure 2]=50 bar.
The time to the fourth hotspot {time 1} was 24 minutes.
The polyether carbonate polyol so prepared is distinguished by the following properties:
incorporated $CO_2$ [wt. %], based on the portion of the polymer formed under $CO_2$: 18.0 wt. %;
selectivity, indicated as the ratio of cyclic carbonate (undesirable secondary product) to polyether carbonate polyol=0.27;
the OH number was 66.7 mg/g;
polydispersity: 1.53

Example 3

Preparation of a Polyether Carbonate Polyol (Comparison Example)

The procedure was carried out according to Example 1, except that [$CO_2$ pressure 1]=[$CO_2$ pressure 2]=50 bar, and in such a manner that [PO amount 1]+[PO amount 2]+[PO amount 3] were added in one portion (64 g).
The time to the hotspot under $CO_2$ {time 1} was 8 minutes.

The polyether carbonate polyol so prepared is distinguished by the following properties:
incorporated $CO_2$ [wt. %], based on the portion of the polymer formed under $CO_2$: 18.8 wt. %;
selectivity, indicated as the ratio of cyclic carbonate (undesirable secondary product) to polyether carbonate polyol=0.24;
the OH number was 69.5 mg/g;
polydispersity: 1.85

Example 4

Preparation of a Polyether Carbonate Polyol (Comparison Example)

The procedure was carried out according to Example 1, except that [PO amount 2], [PO amount 3] and [PO amount 4] were not added. This means that only 25 g of PO were added under $CO_2$-free conditions before PO was metered in continuously under 50 bar $CO_2$ for the copolymerisation. There was a marked build up of PO (>>15 wt. %) in the reactor, so that the reaction was terminated for safety reasons.

Example 5

Preparation of a Polyether Carbonate Polyol (Comparison Example)

The procedure was carried out according to Example 1, except that [PO amount 1]+[PO amount 2]+[PO amount 3] were added in one portion (64 g).
As a result of a build up of PO in the reactor, an unexpected hotspot ($\Delta T=0.31°$ C.) occurred during the continuous addition of the PO under 50 bar $CO_2$. Safe operation of the system is not possible with such unexpected hotspots.

Example 6

Preparation of a Polyether Carbonate Polyol (Comparison Example)

The procedure was carried out according to Example 1, except that the PO amounts were reduced as follows:
[PO amount 1]=8 g,
[PO amount 2]=7 g,
[PO amount 3]=6 g and
[PO amount 4]=21 g.
There was a marked build up of PO (>>15 wt. %) in the reactor, so that the reaction was terminated for safety reasons.

Example 7

Preparation of a Polyether Carbonate Polyol (According to the Invention)

The procedure was carried out according to Example 1, except that the PO amounts were increased as follows:
[PO amount 1]=33 g,
[PO amount 2]=27 g,
[PO amount 3]=25 g and
[PO amount 4]=67 g.
The amount [PO remainder] was 397 g.
The time to the fourth hotspot {time 1} was 21 minutes.
The polyether carbonate polyol so prepared is distinguished by the following properties: incorporated $CO_2$ [wt. %], based on the portion of the polymer formed under $CO_2$: 20.3 wt. %;

selectivity, indicated as the ratio of cyclic carbonate (undesirable secondary product) to polyether carbonate polyol=0.18;
the OH number was 68.0 mg/g;
polydispersity: 1.42

Example 8

Preparation of a Polyether Carbonate Polyol (According to the Invention)

The procedure was carried out according to Example 1, except that [temperature 1] was 120° C.
The time to the fourth hotspot {time I} was 63 minutes.
The polyether carbonate polyol so prepared is distinguished by the following properties: incorporated $CO_2$ [wt. %], based on the portion of the polymer formed under $CO_2$: 20.9 wt. %;
selectivity, indicated as the ratio of cyclic carbonate (undesirable secondary product) to polyether carbonate polyol=0.20;
the OH number was 70.6 mg/g;
polydispersity: 1.38

Example 9

Preparation of a Polyether Carbonate Polyol (According to the Invention)

The procedure was carried out according to Example 1, except that [temperature 1] was 110° C.
The time to the fourth hotspot {time 1} was 141 minutes.
The polyether carbonate polyol so prepared is distinguished by the following properties: incorporated $CO_2$ [wt. %], based on the portion of the polymer formed under $CO_2$: 21.5 wt. %;
selectivity, indicated as the ratio of cyclic carbonate (undesirable secondary product) to polyether carbonate polyol=0.19;
the OH number was 66.2 mg/g;
polydispersity: 1.40

Example 10

Preparation of a Polyether Carbonate Polyol (According to the Invention)

The procedure was carried out according to Example 1, except that [$CO_2$ pressure 2] was 30 bar.
The time to the fourth hotspot {time 1} was 20 minutes.
The polyether carbonate polyol so prepared is distinguished by the following properties: incorporated $CO_2$ [wt. %], based on the portion of the polymer formed under $CO_2$: 20.2 wt. %;
selectivity, indicated as the ratio of cyclic carbonate (undesirable secondary product) to polyether carbonate polyol=0.19;
the OH number was 66.5 mg/g;
polydispersity: 1.39

Example 11

Preparation of a Polyether Carbonate Polyol (According to the Invention)

The procedure was carried out according to Example 1, except that [$CO_2$ pressure 2] was 15 bar.
The time to the fourth hotspot {time 1} was 14 minutes.
The polyether carbonate polyol so prepared is distinguished by the following properties: incorporated $CO_2$ [wt. %], based on the portion of the polymer formed under $CO_2$: 19.4 wt. %;
selectivity, indicated as the ratio of cyclic carbonate (undesirable secondary product) to polyether carbonate polyol=0.18;
the OH number was 68.5 mg/g;
polydispersity: 1.43

Example 12

Preparation of a Polyether Carbonate Polyol (According to the Invention)

The procedure was carried out according to Example 1, except that [$CO_2$ pressure 2] was 5 bar.
The time to the fourth hotspot {time 1} was 17 minutes.
The polyether carbonate polyol so prepared is distinguished by the following properties: incorporated $CO_2$ [wt. %], based on the portion of the polymer formed under $CO_2$: 19.6 wt. %; selectivity, indicated as the ratio of cyclic carbonate (undesirable secondary product) to polyether carbonate polyol=0.15;
the OH number was 65.8 mg/g;
polydispersity: 1.69

Example 13

Preparation of a Polyether Carbonate Polyol (Comparison Example)

The procedure was carried out according to Example 1, except that [$CO_2$ pressure 1] was 50 bar. After addition of [PO amount 1]=25 g, no marked catalyst activation on the basis of a "hotspot" was observed over a period of two hours. Nor was any $CO_2$ consumed. The test was therefore terminated.

Example 14

Preparation of a Polyether Carbonate Polyol (According to the Invention)

The procedure was carried out according to Example 1, except that the H-functional starter compound 1,8-octanediol was replaced by 161 g of PET-1. The amount of PO added at 1.8 g/minute was 387 g [PO remainder].
The time to the fourth hotspot {time 1} was 8 minutes.
The polyether carbonate polyol so prepared is distinguished by the following properties: incorporated $CO_2$ [wt. %], based on the portion of the polymer formed under $CO_2$: 18.4 wt. %;
selectivity, indicated as the ratio of cyclic carbonate (undesirable secondary product) to polyether carbonate polyol=0.11;
the OH number was 55.4 mg/g;
polydispersity: 1.17

The results of the polyether carbonate preparation are summarised in Table 1. If the first activation steps are carried out in the presence of $CO_2$, either no activation takes place at all, if the catalyst sees first $CO_2$ and then, after a time delay, epoxide (Comparison Example 13), or the product quality becomes poorer (lower $CO_2$ incorporation; poorer selectivity, i.e. greater cyclic/linear ratio; higher polydispersity) when $CO_2$ and epoxide are added at the same time (Comparison Examples 2 and 3). Comparison Example 4 shows that a single activation under $CO_2$-free conditions does not necessarily lead to complete activation of the catalyst, noticeable by the build up of epoxide, which is critical in terms of safety. If, as in Comparison Example 5, the amount of PO used in the case of a single activation under $CO_2$-free conditions is increased to 64 g (which corresponds to about 12 wt. % of the total amount of epoxide used), a pronounced temperature increase is noted, which is critical in terms of safety and the test therefore had to be terminated.

The amounts of epoxide for activation are not to be chosen as small as desired if the catalyst is to be activated completely (Comparison Example 6). With an amount of epoxide according to the invention in the activation steps, good activation of the catalyst is achieved (Examples 1 and 7 to 12 according to the invention).

A temperature of 120° C. or 110° C. is advantageous in the activation steps as regards higher $CO_2$ incorporation and better selectivity (i.e. higher proportion of linear polyether carbonate polyol in the reaction product; lower polydispersity) (Examples 8 and 9 according to the invention).

If the $CO_2$ pressure in the activation is reduced from 50 bar to 30 bar, 15 bar and down to 5 bar (see Example 1 and Examples 10 to 12), the time to activation is shortened, while the amount of $CO_2$ incorporated is approximately comparable, and improved selectivity (smaller cyclic/linear ratio) is observed, the polydispersity increasing at a $CO_2$ pressure in the activation of only 5 bar (Example 12).

TABLE 1

Results of the polyether carbonate polyol preparation

| | Activation step | | | | | | | | | | | | |
|---|---|---|---|---|---|---|---|---|---|---|---|---|---|
| Example | β1 to β4 Temperature 1 [° C.] | β1 to β3 CO2 pressure 1 [bar] | β1 PO amount 1 [g] | β2 PO amount 2 [g] | β3 PO amount 3 [g] | β4 CO2 pressure 2 [bar] | β4 PO amount 4 [g] | PO remainder [g] | β4 Time 1 [min] | incorporated CO$_2$ [wt. %] | Selectivity cycl./ linear | OH number [mg/g] | Polydispersity |
| 1 | 130 | 0 | 25 | 20 | 19 | 50 | 50 | 435 | 33 | 19.9 | 0.21 | 67.2 | 1.45 |
| 2 (comp.) | 130 | 50 | 25 | 20 | 19 | 50 | 50 | 435 | 24 | 18.0 | 0.27 | 66.7 | 1.53 |
| 3 (comp.) | 130 | 50 | 64 | — | — | 50 | 50 | 435 | 8 | 18.8 | 0.24 | 69.5 | 1.85 |
| 4 (comp.) | 130 | 0 | 25 | — | — | 50 | — | 524 | build up of PO, therefore test terminated | | | | |
| 5 (comp.) | 130 | 0 | 64 | — | — | 50 | — | 485 | unexpected hotspot (>30° C.) | | | | |
| 6 (comp.) | 130 | 0 | 8 | 7 | 6 | 50 | 21 | 507 | build up of PO, therefore test terminated | | | | |
| 7 | 130 | 0 | 33 | 27 | 25 | 50 | 67 | 397 | 21 | 20.3 | 0.18 | 68.0 | 1.42 |
| 8 | 120 | 0 | 25 | 20 | 19 | 50 | 50 | 435 | 63 | 20.9 | 0.20 | 70.6 | 1.38 |
| 9 | 110 | 0 | 25 | 20 | 19 | 50 | 50 | 435 | 141 | 21.5 | 0.19 | 66.2 | 1.40 |
| 10 | 130 | 0 | 25 | 20 | 19 | 30 | 50 | 435 | 20 | 20.2 | 0.19 | 66.5 | 1.39 |
| 11 | 130 | 0 | 25 | 20 | 19 | 15 | 50 | 435 | 14 | 19.4 | 0.18 | 68.5 | 1.43 |
| 12 | 130 | 0 | 25 | 20 | 19 | 5 | 50 | 435 | 17 | 19.6 | 0.15 | 65.8 | 1.69 |
| 13 (comp.) | 130 | 50 | 25 | | | | | no catalyst activation in two hours | | | | | |
| 14 | 130 | 0 | 25 | 20 | 19 | 50 | 50 | 387 | 8 | 18.4 | 0.11 | 55.4 | 1.17 | comp. = comparison example

The invention claimed is:

1. Process for the preparation of polyether carbonate polyols from one or more H-functional starter substances, one or more alkylene oxides and carbon dioxide in the presence of a double metal cyanide catalyst, which comprises (a) placing the double metal cyanide catalyst and the H-functional starter substance, or a mixture of at least two H-functional starter substances, in a reaction vessel, (b) for activation (b1) adding in a first activation step, a first partial amount, based on the total amount of the amount of alkylene oxides used in the activation and copolymerization, of one or more alkylene oxides to the mixture resulting from step (a), wherein this addition of the partial amount of alkylene oxide is carried out in the absence of $CO_2$, (b2) adding in a second activation step, after the temperature peak reached in the preceding activation step, a second partial amount (based on the total amount of the amount of alkylene oxides used in the activation and copolymerisation) of one or more alkylene oxides to the mixture resulting from the preceding activation step, wherein this addition of the partial amount of alkylene oxide is carried out in the absence of $CO_2$, (b3) in a third activation step, or further activation steps, after the temperature peak reached in the preceding activation step, step (b2) is repeated from one to five times, wherein this addition of the partial amount, or these additions of the partial amounts, of alkylene oxide take(s) place in the absence of $CO_2$, and (c) adding one or more alkylene oxides and carbon dioxide to the mixture resulting from step (b), wherein the partial amount of one or more alkylene oxides used in steps (b1) to (b3) is in each case from 2.0 to 15.0 weight %, based on the total amount of the amount of alkylene oxides used in the activation and copolymerisation.

2. Process according to claim 1, wherein for the activation (b4) in a further activation step, or further activation steps, after the temperature peak reached in the preceding activation step, step (b3) is repeated from one to five times, wherein this addition of the partial amount, or these additions of the partial amounts, of alkylene oxide take(s) place in the absence of $CO_2$.

3. Process according to claim 2, wherein (a) the double metal cyanide catalyst and the H-functional starter substance, or a mixture of at least two H-functional starter substances, is placed in a reaction vessel, (b) for activation (b1) in a first activation step, a first partial amount, based on the total amount of the amount of alkylene oxides used in the activation and copolymerization, of one or more alkylene oxides is added to the mixture resulting from step (a), wherein this addition of the partial amount of alkylene oxide takes place in the absence of $CO_2$, (b2) in a second activation step, after the temperature peak reached in the preceding activation step, a second partial amount, based on the total amount of the amount of alkylene oxides used in the activation and copolymerization, of one or more alkylene oxides is added to the mixture resulting from the preceding activation step, wherein this addition of the partial amount of alkylene oxide takes place in the absence of $CO_2$, (b3) in a third activation step, after the temperature peak reached in the preceding activation step, step (b2) is repeated exactly once, wherein this addition of the partial amount, or these additions of the partial amounts, of alkylene oxide take(s) place in the absence of $CO_2$, (b4) in a further activation step, or further activation steps, after the temperature peak reached in the preceding activation step, step (b3) is repeated exactly once, wherein this addition of the partial amount, or these additions of the partial amounts, of alkylene oxide take(s) place in the presence of $CO_2$, (c) one or more alkylene oxides and carbon dioxide are added to the mixture resulting from step (b).

4. Process according to claim 1, wherein in step (a)

(a1) the H-functional starter substance, or a mixture of at least two H-functional starter substances, is placed in a reaction vessel, and (a2) the temperature of the starter substance, or of the mixture, is brought to from 50 to 200° C. and/or the pressure in the reactor is adjusted to less than 500 mbar, wherein the double metal cyanide catalyst is added to the H-functional starter substance, or to the mixture of at least two H-functional starter substances, in step (a1) or immediately thereafter in step (a2).

5. Process according to claim 2, wherein the partial amount of one or more alkylene oxides used in steps (b 1) to (b4) is in each case from 2.0 to 15.0 weight %, based on the total amount of the amount of alkylene oxides used in the activation and copolymerisation.

6. Process according to claim 1, wherein the partial amount of one or more alkylene oxides used in steps (b 1) to (b4) is in each case from 2.5 to 14.0 weight %, based on the total amount of the amount of alkylene oxides used in the activation and copolymerisation.

7. Process according to claim 1, wherein the partial amount of one or more alkylene oxides used in steps (b1) to (b4) is in each case from 3.0 to 13.0 weight %, based on the total amount of the amount of alkylene oxides used in the activation and copolymerisation.

8. Process according to claim 1, wherein step c is carried out at a temperature in the range of from 110 to 120° C.

9. Process according to claim 1, wherein the H-functional starter substances used are selected from at least one of the group consisting of water, alcohols, amines, thiols, aminoalcohols, thioalcohols, hydroxy esters, polyether polyols, polyester polyols, polyester ether polyols, polycarbonate polyols, polyether carbonate polyols, polyethyleneimines, polyether amines, polytetrahydrofurans, polyether thiols, polyacrylate polyols, castor oil, the mono- or di-glyceride of ricinoleic acid, monoglycerides of fatty acids, chemically modified mono-, di- and/or tri-glycerides of fatty acids, and C1-C24-alkyl fatty acid esters that contain on average at least 2 OH groups per molecule.

10. Process according to claim 9, wherein the H-functional starter substances used are selected from at least one of the group consisting of ethylene glycol, propylene glycol, 1,3-propanediol, 1,3-butanediol, 1,4-butanediol, 1,5-pentanediol, 2-methyl-1,3-propanediol, neopentyl glycol, 1,6-hexanediol, 1,8-octanediol, diethylene glycol, dipropylene glycol, glycerol, trimethylolpropane, di- and tri-functional polyether polyols, wherein the polyether polyol is composed of a di- or tri-H-functional starter substance and propylene oxide or of a di- or tri-H-functional starter substance, propylene oxide and ethylene oxide and the polyether polyols have a molecular weight Mn in the range from 62 to 4500 g/mol and a functionality of from 2 to 3.

11. Process according to claim 1, wherein the double metal cyanide catalyst used contains at least one double metal cyanide compound selected from the group consisting of zinc hexacyanocobaltate(III), zinc hexacyanoiridate(III), zinc hexacyanoferrate(III) and cobalt(II) hexacyanocobaltate(III).

12. Process according to claim 11, wherein the double metal cyanide catalyst used additionally contains at least one organic complex ligand selected from the group consisting of aliphatic ether, ethanol, isopropanol, n-butanol, isobutanol, sec-butanol, tert-butanol, 2-methyl-3-buten-2-ol, 2-methyl-3-butyn-2-ol, ethylene glycol mono-tert-butyl ether, diethylene glycol mono-tert-butyl ether, tripropylene glycol monomethyl ether and 3-methyl-3-oxetan-methanol.

13. Process according to claim 1, which is carried out in a tubular reactor, stirrer vessel or loop reactor.

14. Process according to claim 13, wherein said process is carried out in a stirrer vessel, and wherein in step (c) one or more H-functional starter compounds are metered into the reactor continuously during the reaction.

15. Process according to claim 1, wherein the alkylene oxide is ethylene oxide and/or propylene oxide.

* * * * *